(12) United States Patent
Kobayashi et al.

(10) Patent No.: US 9,342,456 B2
(45) Date of Patent: May 17, 2016

(54) STORAGE CONTROL PROGRAM FOR HIERARCHY RELOCATION CONTROL, STORAGE SYSTEM WITH HIERARCHY RELOCATION CONTROL AND HIERARCHY CONTROL APPARATUS THEREOF

(71) Applicant: FUJITSU LIMITED, Kawasaki-shi, Kanagawa (JP)

(72) Inventors: Eiichi Kobayashi, Yokohama (JP); Sachiko Terai, Yokohama (JP); Chunyou Shao, Kawasaki (JP); Pierre Ribault, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 91 days.

(21) Appl. No.: 14/198,656

(22) Filed: Mar. 6, 2014

(65) Prior Publication Data

US 2014/0297940 A1 Oct. 2, 2014

(30) Foreign Application Priority Data

Mar. 28, 2013 (JP) ................................ 2013-068865

(51) Int. Cl.
| | | |
|---|---|---|
| *G06F 12/00* | (2006.01) | |
| *G06F 13/00* | (2006.01) | |
| *G06F 12/08* | (2016.01) | |
| *G06F 3/06* | (2006.01) | |
| *G06F 11/00* | (2006.01) | |

(52) U.S. Cl.
CPC ............ *G06F 12/0866* (2013.01); *G06F 3/061* (2013.01); *G06F 3/067* (2013.01); *G06F 3/0647* (2013.01); *G06F 3/0653* (2013.01); *G06F 3/0689* (2013.01); *G06F 11/00* (2013.01); *G06F 12/0888* (2013.01)

(58) Field of Classification Search
None
See application file for complete search history.

(56) References Cited

U.S. PATENT DOCUMENTS

| | | | |
|---|---|---|---|
| 5,594,883 A | 1/1997 | Pricer | |
| 5,933,853 A | 8/1999 | Takagi | |
| 2004/0111443 A1* | 6/2004 | Wong et al. | ............ 707/202 |

(Continued)

FOREIGN PATENT DOCUMENTS

| | | |
|---|---|---|
| JP | 06-309224 | 11/1994 |
| JP | 08-077073 | 3/1996 |
| JP | 2011-227898 | 11/2011 |

OTHER PUBLICATIONS

Extended European Search Report dated Jul. 17, 2014 for corresponding European Patent Application No. 14157294.1, 6 pages.

*Primary Examiner* — Sean D Rossiter
(74) *Attorney, Agent, or Firm* — Fujitsu Patent Center

(57) ABSTRACT

A non-transitory computer readable storage medium that stores a storage control program causing a computer to execute a control process of a storage including a first storage device with first access speed, and a second storage device with second access speed that is slower than the first access speed, includes monitoring access frequency to data in the first and second storage devices; relocating data, the access frequency of which exceeds a first reference value, in the second storage device, to the first storage device; and conducting a overload processing of retaining, in the cache memory, at least a part of the data in the second storage device when the second storage device is in an overload state. the access frequency monitoring is executed in a state where the partial data is retained in the cache memory, and the relocating is executed based on the access frequency to the partial data.

12 Claims, 19 Drawing Sheets

(56) References Cited

U.S. PATENT DOCUMENTS

| | | |
|---|---|---|
| 2008/0235467 A1 | 9/2008 | Tagawa |
| 2010/0218040 A1* | 8/2010 | Bodmer ............ G06F 11/3485 714/6.32 |
| 2011/0167217 A1* | 7/2011 | Montgomery ................ 711/114 |
| 2011/0258379 A1 | 10/2011 | Hayashi |
| 2012/0239856 A1* | 9/2012 | Cho ............................. 711/103 |
| 2013/0339786 A1* | 12/2013 | Samanta et al. ............. 714/6.23 |
| 2014/0013027 A1* | 1/2014 | Jannyavula Venkata et al. ............................. 711/103 |
| 2014/0188947 A1* | 7/2014 | Morris ......................... 707/812 |
| 2014/0223106 A1* | 8/2014 | Shivashankaraiah et al. ............................. 711/136 |
| 2014/0245062 A1* | 8/2014 | Cooper et al. ............... 714/6.22 |
| 2015/0039835 A1* | 2/2015 | Agarwal et al. .............. 711/133 |

\* cited by examiner

FIG.16

| OVERLOAD STATE RAID GROUP TABLE |
|---|
| ID OF RAID GROUP |
| 21 |
| y |
| --- |
| z |

FIG.17

SSD CACHE RETENTION CANDIDATE TABLE

| ID OF RAID GROUP | ID OF RELOCATION UNIT OF RETENTION CANDIDATE |
|---|---|
| 21 | 211 |
| 21 | 213 |
| 21 | 212 |
| 21 | 215 |
| -- | -- |
| z | z2 |

FIG.18

SSD CACHE RETENTION TARGET TABLE

| ID OF RAID GROUP | ID OF RELOCATION UNIT OF RETENTION CANDIDATE |
|---|---|
| 21 | 211 |
| 21 | 213 |
| y | ... |
| y | ... |
| ... | ... |
| z | ... |

FIG.19
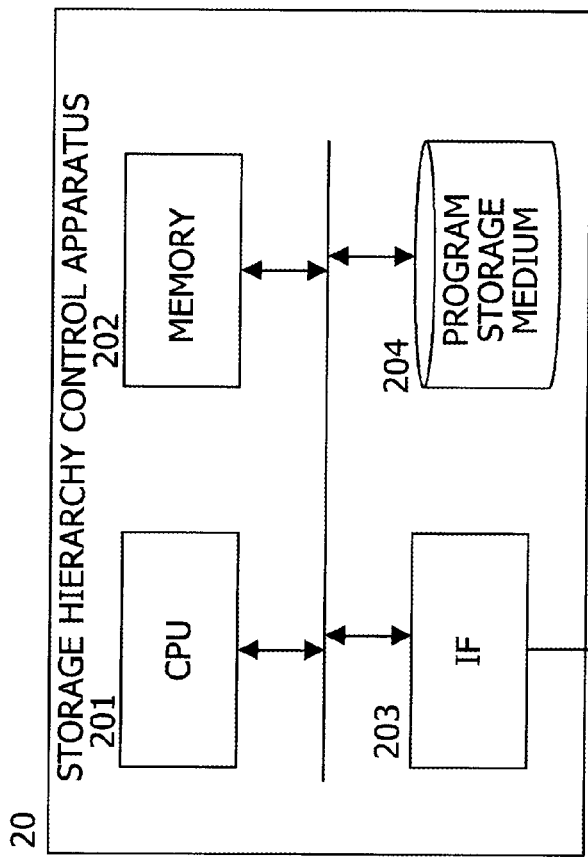
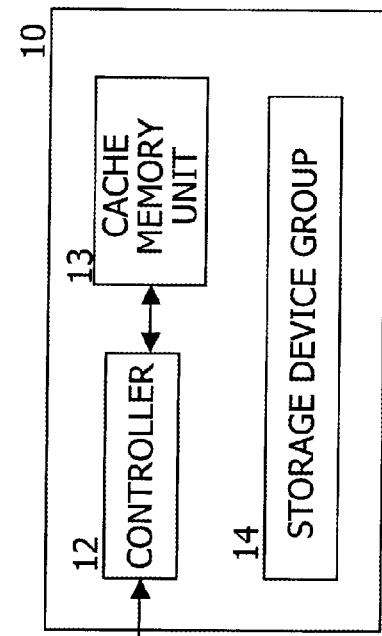

STORAGE CONTROL PROGRAM FOR HIERARCHY RELOCATION CONTROL, STORAGE SYSTEM WITH HIERARCHY RELOCATION CONTROL AND HIERARCHY CONTROL APPARATUS THEREOF

CROSS-REFERENCE TO RELATED APPLICATION

This application is based upon and claims the benefit of priority of the prior Japanese Patent Application No. 2013-068865, filed on Mar. 28, 2013, the entire contents of which are incorporated herein by reference.

FIELD

The present invention relates to a storage control program for hierarchy relocation control, a storage system with hierarchy relocation control and a hierarchy control apparatus thereof.

BACKGROUND

A storage system is demanded of meeting the needs of high-speed access, large capacity and low cost. Thus, a storage system includes a storage device of a hierarchy which has a high bit unit price but enables high-speed access, and a storage device of a hierarchy which yields low-speed access but has a low bit unit price, and performs automated hierarchy control of storing data of high access frequency in the storage device of a hierarchy which enables high-speed access, and storing data of low access frequency in the storage device of a hierarchy which is low speed but has a low bit unit price and large capacity.

With the automated hierarchy control, access frequency to data of relocation units of high-speed hierarchy and low-speed hierarchy is monitored, data of relocation units of high access frequency in the low-speed hierarchy is relocated to the high-speed hierarchy, and data of relocation units of low access frequency in the high-speed hierarchy is relocated to the low-speed hierarchy.

Automated hierarchy control is described, for example, in Japanese Patent Application Laid-open No. 2011-227898, Japanese Patent Application Laid-open No. H8-77073, and Japanese Patent Application Laid-open No. H6-309224.

Nevertheless, with the automated hierarchy control described above, when access to the storage device of a low-speed hierarchy increases suddenly and reaches a performance limit, a delay in response, in which the response time from access to response becomes longer, will arise. Consequently, the access frequency to the relocation units in the low-speed hierarchy will become lower than the access frequency that was actually requested. Thus, there are cases where data, which is to be relocated to a to higher speed hierarchy, continues to remain in a low-speed hierarchy, and the overall response time is not optimized. In other words, even though the overall storage system may have some leeway in terms of performance, when the storage system reaches a performance limit by becoming locally an overload state, it is not possible to properly evaluate the originally requested access frequency, and the intended relocation control cannot be performed.

SUMMARY

According to the first aspect of disclosed embodiment, a non-transitory computer readable storage medium that stores therein a storage control program causing a computer to execute a control process of a storage including a first storage device with first access speed, a second storage device with second access speed that is slower than the first access speed, and a cache memory, the control process comprising:
monitoring access frequency to data in the first and second storage devices;
relocating data, the access frequency of which exceeds a first reference value, in the second storage device, to the first storage device; and
conducting a overload processing of retaining, in the cache memory, at least a part of the data in the second storage device when the second storage device is in an overload state,
wherein the access frequency monitoring is executed in a state where the partial data is retained in the cache memory, and the relocating is executed based on the access frequency to the partial data.

According to the first aspect of this embodiment, it is possible to appropriately perform the hierarchy control of the storage.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram illustrating an example of the table of the RAID group in an overload state.

FIG. 17 is a diagram illustrating an example of the cache retention candidate table.

FIG. 18 is a diagram illustrating an example of the SSD cache retention target table.

FIG. 19 is a configuration diagram of the storage hierarchy control apparatus 20.

DESCRIPTION OF EMBODIMENTS

[Explanation of Overview of this Embodiment]

Figure 1:
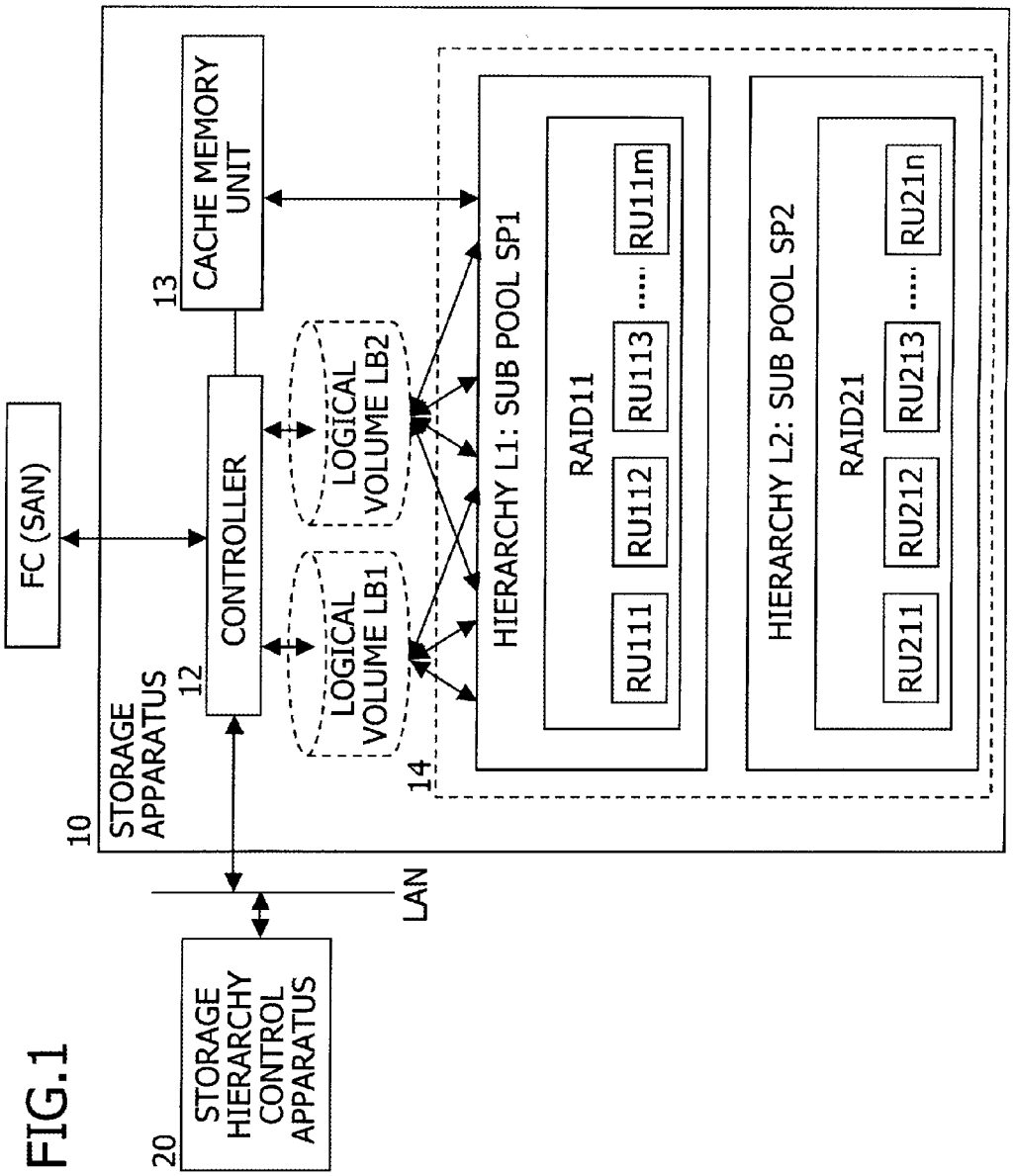
FIG. 1 is a schematic configuration diagram of the storage system in this embodiment.
Figure 2:
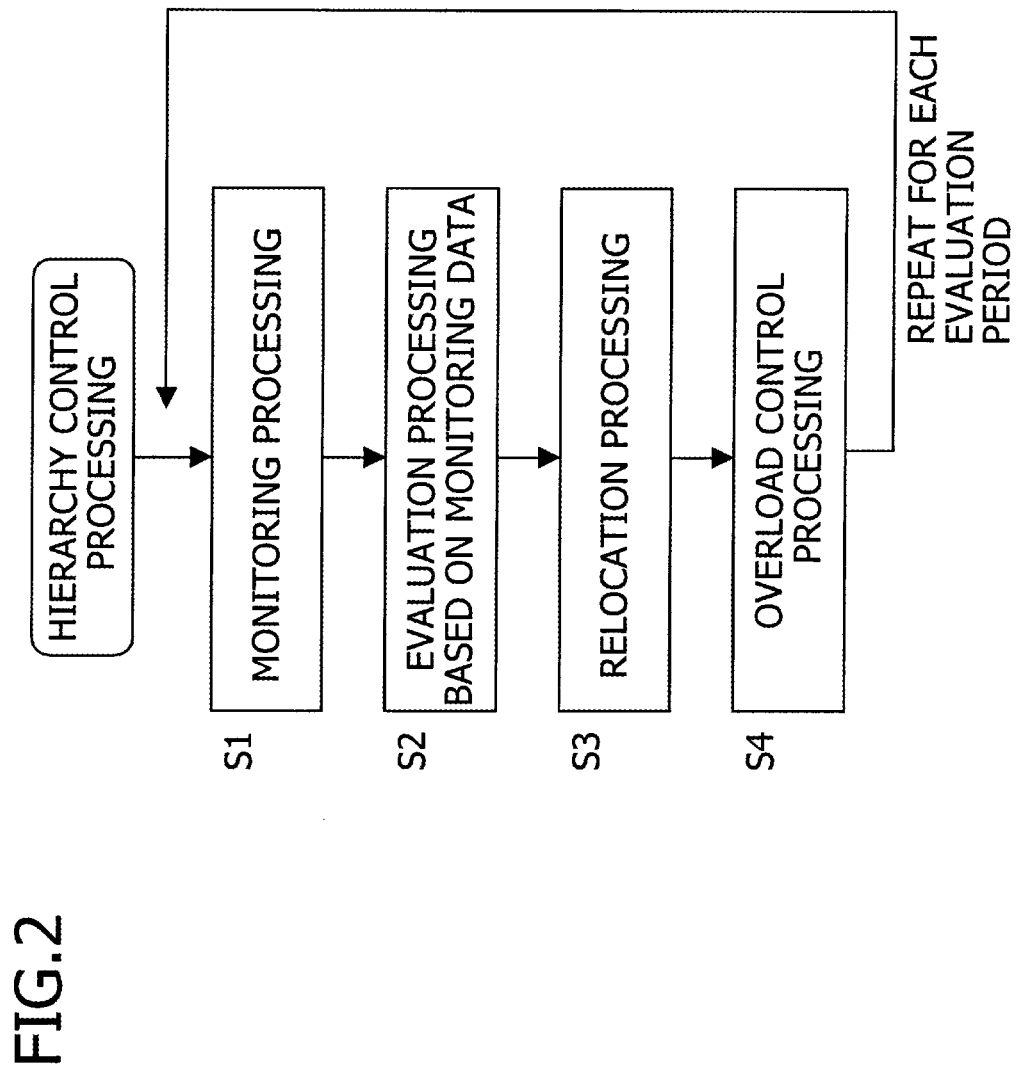
FIG. 2 is a schematic flowchart of the hierarchy control processing of the storage control in this embodiment.

FIG. 1 is a schematic configuration diagram of the storage system in this embodiment. FIG. 2 is a schematic flowchart of the hierarchy control processing of the storage control in this embodiment. The outline of this embodiment is now explained with reference to FIGS. 1 and 2. The details will be explained thereafter.

The storage apparatus 10 includes a controller 12 configured to receive an access request from a plurality of servers not illustrated via a fiber channel FC, which is a storage area network (SAN), a cache memory unit 13, and a storage device group 14 which is a hardware resource.

The controller 12 allocates a storage device group 14, which is a hardware resource, to virtual logical volumes LB1, LB2, receives an access request to the respective logical volumes, and makes an access request to a RAID group within the storage device group according to the allocation of the storage device group. Moreover, the controller 12 performs cache control in response to the access request by using the cache memory unit 13.

In general cache control, for example, the controller 12 checks to whether data of the address, for which the access request was made, is stored in the cache memory unit 13, reads the data in the cache memory unit 13 and returns a response in the case of a cache hit, and, if there is no cache hit, accesses the storage device group 14 to read the data and then returns a response. In addition, the controller 12 stores, in the cache memory unit 13, the data that was read without a cache hit. Here, when there is shortage in the unused capacity of the cache memory unit 13, the previously stored data is written out and deleted.

The storage device group 14 has a hierarchy structure of physical hard disks or the like. The storage device group 14 includes, for example, a sub pool SP1 of a high-order hierarchy L1 in a high-speed access storage device in which the response time from access request to response is short, and a sub pool SP2 of a low-order hierarchy L2 in a low-speed access storage device that is slower than the high-speed access storage device. The storage device of the high-order hierarchy L1 is a storage device which places emphasis on speed and has a high bit unit price, and the storage device of the low-order hierarchy L2 is a storage device which places emphasis on cost and, while it is low-speed, has a low bit unit price and a large capacity. Accordingly, the hierarchy L2 is configured to have a larger capacity than the hierarchy L1. The hierarchy structure is not limited to the two layers of FIG. 1, and may also be three or more layers. In the foregoing case, the storage device group 14 will have three or more layers from a high-order hierarchy of higher speed and higher bit unit price to a low-order hierarchy of lower speed and lower bit unit price.

The storage device in the storage device group 14 includes, as an example of physical disks, RAID groups RAID 11 and RAID 12. However, the storage device of the high-speed access hierarchy L1 may also be a solid state disk (SSD) such as a flash memory. Moreover, the physical disk may also be a single physical disk without configuring a RAID group.

Accordingly, the storage device group 14 has a hierarchy structure configured from a hierarchy L1 of a storage device which places emphasis on speed, and a hierarchy L2 of a storage device which is low-speed but is also low cost and enables a large capacity. In addition, the storage hierarchy control apparatus 20 performs automated hierarchy control of relocating data of high access frequency to the storage device of the hierarchy L1 which places emphasis on speed, and relocating data of low access frequency to the storage device of the hierarchy L2 which places emphasis on cost. Accordingly, with the storage device group 14, the access frequency of the relocation units RU111-RU11m, RU211-RU21n, data in which is relocated based on the automated hierarchy control is measured, and data is relocated to the appropriate hierarchy L1 or L2 according to the access frequency of the respective data.

In order to perform this kind of automated hierarchy control, the controller 12 monitors the access request and measures the access frequency of the relocation units RU in the RAID group (or the physical disk; hereinafter the same). Subsequently, the storage hierarchy control apparatus 20 relocates data of a relocation unit RU with high access frequency from a lower speed hierarchy L2 to a higher speed hierarchy L1, and relocates data of a relocation unit RU with low access frequency from a higher speed hierarchy L1 to a lower speed hierarchy L2.

In this kind of automated hierarchy control, when access to data in the low-speed hierarchy L2 suddenly increases and the utilization rate of the physical disks of the RAID group RAID 21 suddenly increases, which results in an overload state, and reaches the performance limit, a delay in response will occur. Consequently, the access frequency to the relocation units RU in the RAID group RAID 21 of the low-speed hierarchy L2 is reduced or suppressed. As a result, it is not possible to appropriately evaluate the access frequency to those relocation units RU, and relocation processing to the high-speed hierarchy L1 is not performed to data, even though that data is actually the data with high access frequency requested from the server, and that data continues to remain in the low-speed hierarchy L2. Consequently, even though the overall storage system may have some leeway in terms of performance, when a locally overload state arises as described above, it is not possible to perform relocation processing based on the intended hierarchy control.

Thus, in this embodiment, data in the RAID group that becomes in an overload state in the low-speed hierarchy L2 is retained in the cache memory unit during the evaluation period of the access frequency. Here, the retained data will not be purged based on normal cache control. As a result of retaining the data of the RAID group in an overload state in the cache memory unit as described above, the access frequency to that data is correctly measured. Moreover, since it is also possible to temporarily resolve the overload state of that RAID group, the actually requested access frequency to the data in that RAID group is also be measured.

In addition, when it is determined that the access frequency is high during the foregoing evaluation period, data of that relocation unit RU is relocated to the high-speed hierarchy L1. Consequently, it is possible to reduce or suppress an undesirable state where data in which the requested access frequency is high but the RAID group to which it belongs becomes an overload state and the actually executed access frequency does not increase, and continues to remain in the low-speed hierarchy L2.

FIG. 2 is a schematic flowchart of the hierarchy control processing performed by the storage hierarchy control apparatus 20. The storage hierarchy control apparatus 20 repeats the processes S1-S4 of FIG. 2 at a cycle of a predetermined evaluation period. Foremost, the storage hierarchy control apparatus 20 acquires in monitoring processing S1, from the controller 12 in the storage apparatus 10, the monitoring data which includes the access frequency for each of the relocation units RU during the previous evaluation period, and the load (utilization rate of the physical disk) of the respective RAID groups, and monitors the monitoring data. In other words, since the controller 12 has measured the access frequency for each relocation unit and the load condition for each RAID group, the controller 12 acquires and monitors the measurement data.

Here, the utilization rate of the physical disk means the ratio occupied by the operating time from the access request to a physical disk up to the response, in each unit time. Accordingly, in a case of a physical disk with slow access speed, the utilization rate becomes high even when the access frequency is low, and, for example, when the utilization rate reaches 100%, the physical disk reaches its performance limit and becomes an overload state. In the case of a RAID group configured from a plurality of physical disks, the utilization rate of all physical disks is measured, and the utilization rate of the RAID group is monitored. However, due to the configuration of the RAID group, when a plurality of disks are accessed in parallel in response to an access request, the utilization rate of the RAID group can also be monitored by measuring the utilization rate of a single physical disk.

Subsequently, the storage hierarchy control apparatus 20 determines, in evaluation processing S2 based on the monitoring data, the candidates of relocation units to which data should be relocated based on the access frequency of the relocation units RU. Specifically, relocation units of the low-order hierarchy in which the access frequency exceeds a first reference value become candidates of relocation to the high-order hierarchy, and relocation units of the high-order hierarchy in which the access frequency is a second reference value or lower become candidates of relocation to the low-order hierarchy.

In addition, the storage hierarchy control apparatus 20 relocates, in relocation processing S3, data of the relocation units RU of the relocation candidates to different hierarchies, respectively.

Moreover, the storage hierarchy control apparatus 20 notifies the controller 12 of the storage apparatus 10, in overload control processing S4, relocation units with relatively high access frequency among the relocation units in the RAID group in an overload state as the cache candidates to be retained in the cache memory unit.

Pursuant to the above, during the subsequent evaluation period, the controller 12 stores the accessed data in the cache memory unit when data of the relocation unit of the cache candidate is accessed, and continues to retain that data during the evaluation period thereof, regardless of normal cache control. In other words, data retained in the cache candidate is prevented from overflowing from the cache memory unit pursuant to separate data being stored in the cache memory, and a forced retention state is maintained. In addition, the controller 12 measures the access frequency for each relocation unit, including cases where a cache hit occurs in the cache memory unit.

As described above, by forcibly retaining, in the cache memory unit during the evaluation period, data of relocation units with high access frequency in the RAID group in an overload state, since access is made via the cache memory unit even when the RAID group is in an overload state, it is possible to appropriately measure the originally requested access frequency. Moreover, when the RAID group that was in an overload state returns to a normal state, since the access request to the data that is not retained in the cache memory unit is no longer reduced or suppressed, the access frequency thereof is also able to be appropriately measured. It is thereby possible to appropriately perform the hierarchy control.

Moreover, the storage hierarchy control apparatus 20 in the overload control processing S4 deletes, from the cache candidates, the relocation units of data retained in the cache memory unit during the evaluation period. In other words, data of the relocation units for which the access frequency was appropriately measured in the evaluation period is deleted based on normal cache control as needed.

[Detailed Explanation of Embodiment]

Details of this embodiment are now explained. Explanation which overlaps with the foregoing outline explanation will be omitted as needed.

Figure 3:
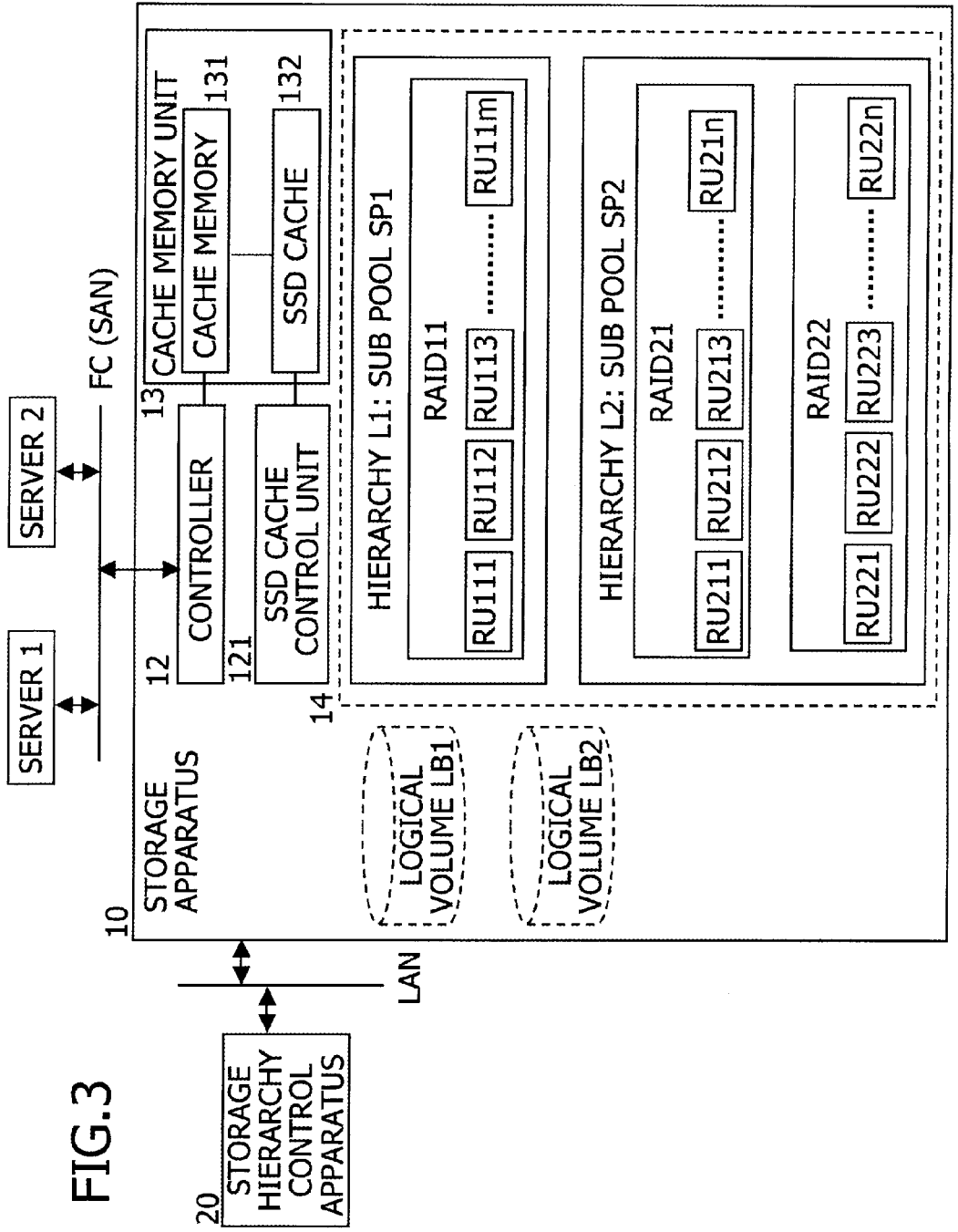
FIG. 3 is a configuration diagram of the storage system in this embodiment.

FIG. 3 is a configuration diagram of the storage system in this embodiment. As with FIG. 1, the storage system includes a storage apparatus 10 which is accessed from a plurality of servers via a fiber channel to FC (SAN), and a storage hierarchy control apparatus 20. In FIG. 3, the configuration that differs from FIG. 1 is that, in the storage apparatus 10, the cache memory unit 13 includes a high-speed cache memory 131 such as a DRAM with a high bit unit price, and an SSD cache 132 of a type of a large capacity flash memory such as an SSD available at a low bit unit price, includes an SSD cache control unit 121 configured to control the SSD cache 132 in addition to the controller 12, and includes a plurality of RAID groups RAID 21 and RAID 22 in the low-order hierarchy L2 of a physical storage device group 14.

The SSD cache 132 is a memory for expanding the cache memory 131, and may be used concurrently with the storage automated hierarchy control. The SSD cache control unit 121 writes and retains data in the SSD cache 132 when the data stored in the cache memory 131 overflows, and performs control as though the capacity of the cache memory 131 has expanded.

Subsequently, with normal cache control, the accessed data is foremost stored and retained in the cache memory 131 and, when the retained data overflows from the cache memory 131 as a result of the cache control, the data is stored and retained in the SSD cache 132. In addition, when data overflows from the SSD cache 132, the data is deleted from the cache memory unit 13.

Moreover, in response to the access request, the controller 12 foremost checks the address in the cache memory 131 to perform a cache determination, reads data and responds when there is a cache hit, checks the address in the SSD cache 132 to perform a cache determination when there is no cache hit in the cache memory 131, reads the data and responds when there is a cache hit in the SSD cache 132, and accesses the data of the corresponding address in the storage device group 14 when there is no cache hit in the SSD cache 132.

Even in cases when the SSD cache technique is to be used concurrently, when data access of the low-speed low-order hierarchy L2 suddenly increases, since the tolerance against the load of the high-speed high-order hierarchy L1 is sufficiently high, it is likely that the access frequency of the low-order hierarchy L2 will be kept lower than the high-speed high-order hierarchy L1. In other words, even when the data of the low-speed low-order hierarchy is cached in the cache memory unit 13, such data may overflow from the cache memory unit 13 due to the access to the high-speed high-order hierarchy.

Moreover, while the SSD cache 132 is of a large capacity, the capacity is still limited, and due to the foregoing reason the data of the low-speed low-order hierarchy tends to be deleted from the cache memory unit due to the cache overflow.

Consequently, similar to a case of not using the SSD cache technique, in the storage automated hierarchy control, the physical disk may approach or reach the performance limit due to the sudden increase in the access to a low-speed low-order hierarchy, cause a delay in response, and there may be cases where an appropriate access frequency cannot be measured.

Figure 4:
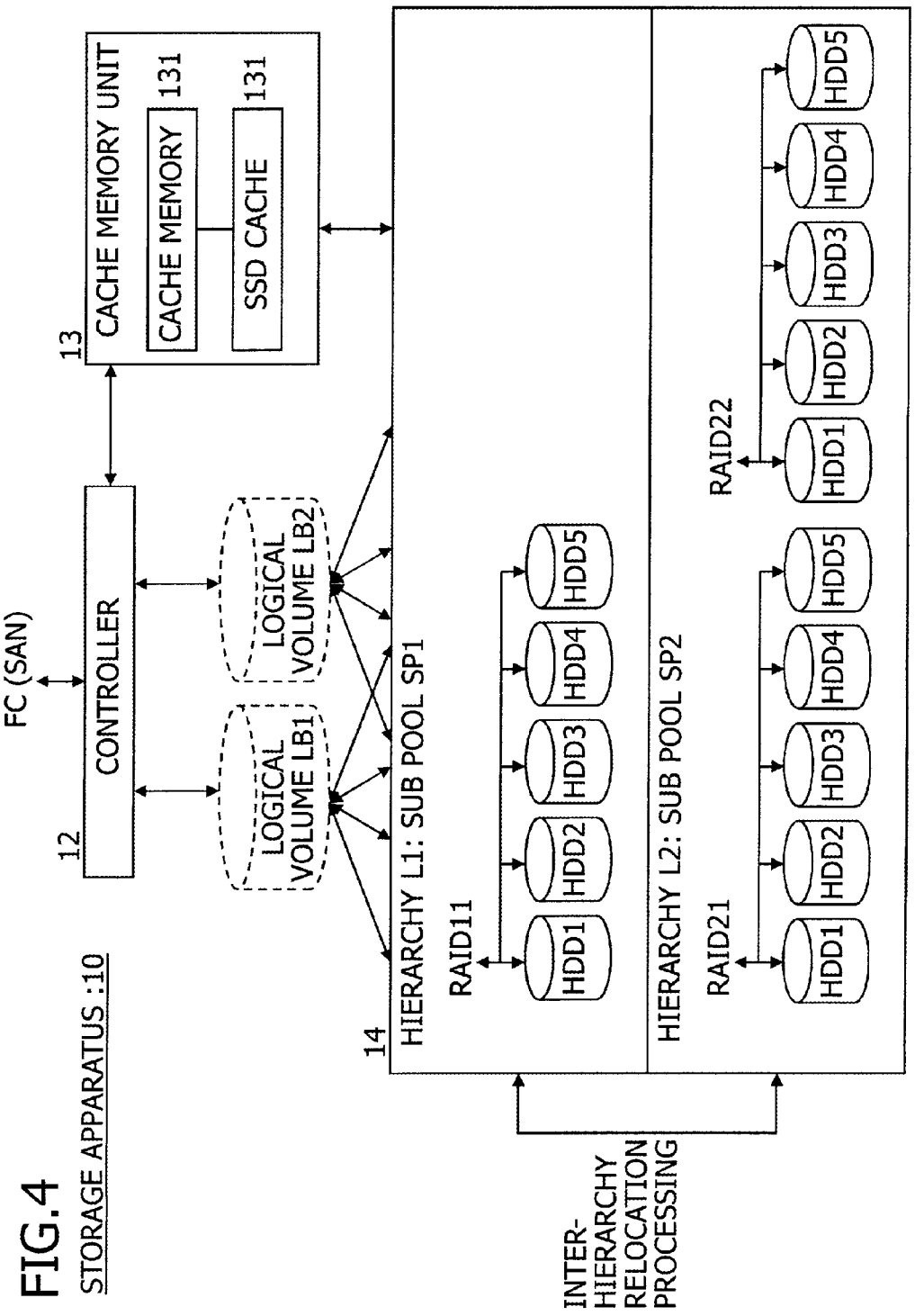
FIG. 4 is a diagram illustrating a configuration example of the storage device group 14 in the storage apparatus 10.

FIG. 4 is a diagram illustrating a configuration example of the storage device group 14 in the storage apparatus 10. As with FIG. 3, the storage device group 14 includes a sub pool SP1 of a high-speed high-order hierarchy L1, and a sub pool SP2 of a low-speed low-order hierarchy L2. The sub pool SP1 of the high-order hierarchy L1 includes, for example, a RAID group RAID 11 including five hard disks HDD. Moreover, the sub pool SP2 of the low-order hierarchy L2 includes two RAID groups RAID 21 and RAID 22 similarly including five hard disks HDD. In other words, the low-order hierarchy L2 has a larger capacity.

The RAID group executes an access operation simultaneously to five HDDs in response to the access request. Accordingly, by monitoring the operating time from the access request up to the response, for one HDD among the five HDDs, it is possible to measure the utilization rate (or busy to rate) to the physical disk of the respective RAID groups. The utilization rate becomes higher as the ratio of a total operating time of the physical disk relation to a predetermined period is higher. When the utilization rate reaches 100, the access request remains in a queue, and the RAID group as a physical disk becomes an overload state; that is, reaches the performance limit.

Meanwhile, the access request to the logical volume is an access that is requested by the server, and that access request is converted into an access request to a RAID group in the storage device group 14 by the controller 12.

Note that the storage device group 14 may be three or more hierarchies, and the number of RAID groups may be different from the number in FIG. 4. Moreover, the sub pool of the high-order hierarchy may also be configured from an SSD.

Figure 5:
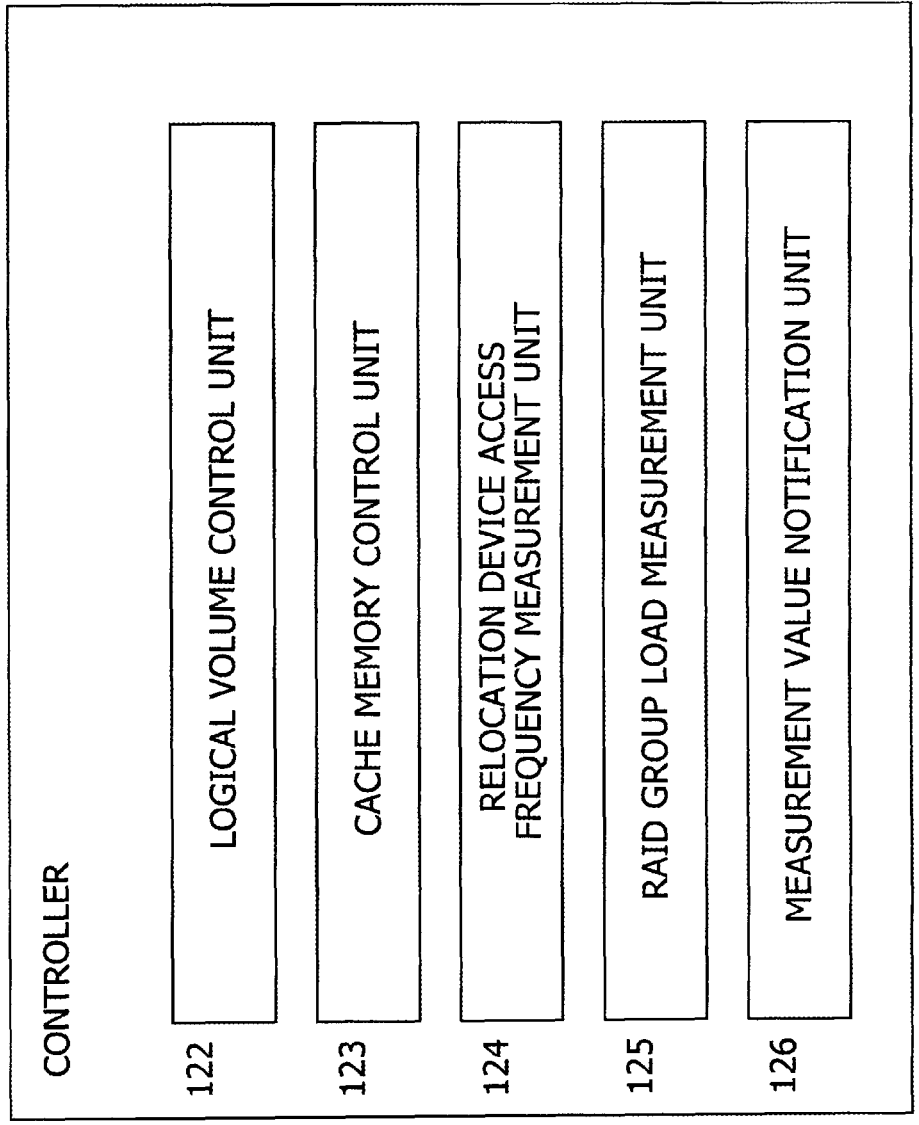
FIG. 5 is a diagram illustrating the configuration of the controller 12 in the storage apparatus.

FIG. 5 is a diagram illustrating the configuration of the controller 12 in the storage apparatus. The controller 12 includes a logical volume control unit 122, a cache memory control unit 123, a relocation unit access frequency measurement unit 124, a RAID group load measurement unit 125, and a measurement value notification unit 126.

The logical volume control unit 122 performs the control of dividing the physical storage device group 14 and assigning the divided physical storage device to the virtual logical volumes, and converting the access request to the logical volumes into an access request to the address of the corresponding RAID group of the storage device group 14. The cache memory control unit 123 performs the foregoing cache control to the cache memory 131.

The relocation unit access frequency measurement unit 124 measures the access frequency to the respective relocation units during the evaluation period; that is, the number of accesses per unit time. As described above, the access request according to which a cache hit occurs in a state where the data in the relocation unit is stored in the cache memory unit to 13 is also counted in the access frequency.

The RAID group load measurement unit 125 measures the utilization rate of the physical disk illustrating the load of the respective RAID groups during the evaluation period, and measures whether it is an overload state. Subsequently, the measurement value notification unit 126 responds to inquiries from the storage hierarchy control apparatus 20, and notifies the access frequency of the measured relocation unit and the load condition of the RAID group.

Figure 6:
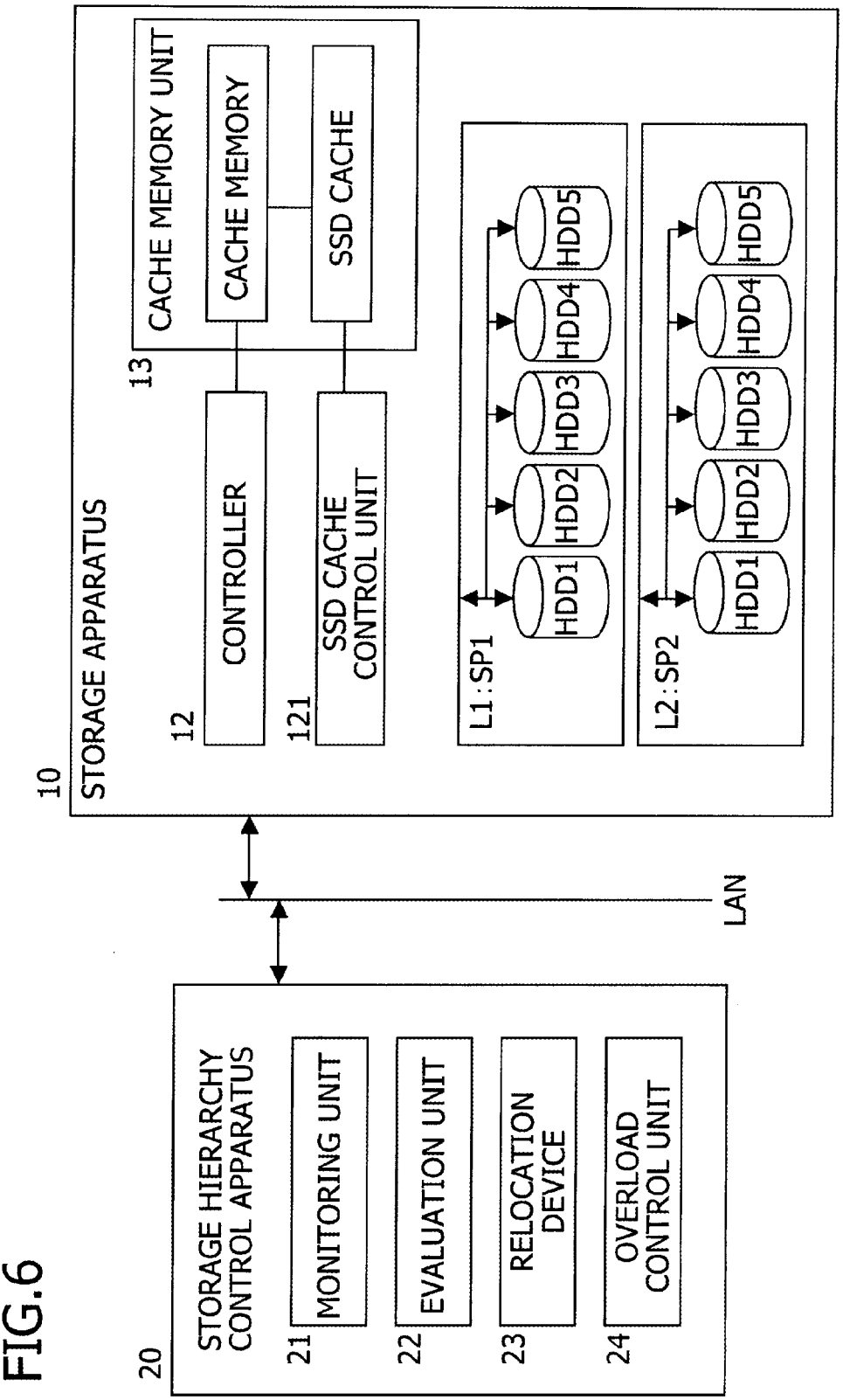
FIG. 6 is a diagram illustrating the configuration of the storage hierarchy control apparatus 20.

FIG. 6 is a diagram illustrating the configuration of the storage hierarchy control apparatus 20. The storage hierarchy control apparatus 20 performs the four types of processing S1-S4 explained in FIG. 2. In other words, the storage hierarchy control apparatus 20 includes a monitoring unit 21 configured to execute monitoring processing S1, a evaluation unit 22 configured to execute evaluation processing S2 to monitoring data, a relocation unit 23 configured to execute relocation processing, and an overload control unit 24 configured to execute overload control processing. The processing to be performed by the respective units will be explained in detail later.

FIG. 19 is a configuration diagram of the storage hierarchy control apparatus 20. The storage hierarchy control apparatus 20 includes a CPU 201 as a processor, a memory 202, a storage medium 204 configured to store software such as a storage hierarchy control program, and an interface 203 with the outside, and these components are connected via an internal bus. By the processor 201 executing the storage hierarchy control program stored in the memory 202, the processor 201 performs hierarchy control of the storage apparatus 10, and thereby configures the monitoring unit 21, the evaluation unit 22, the relocation device 23, and the overload control unit 24 of FIG. 6.

[Example of Normal Storage Hierarchy Control]

Figure 7:
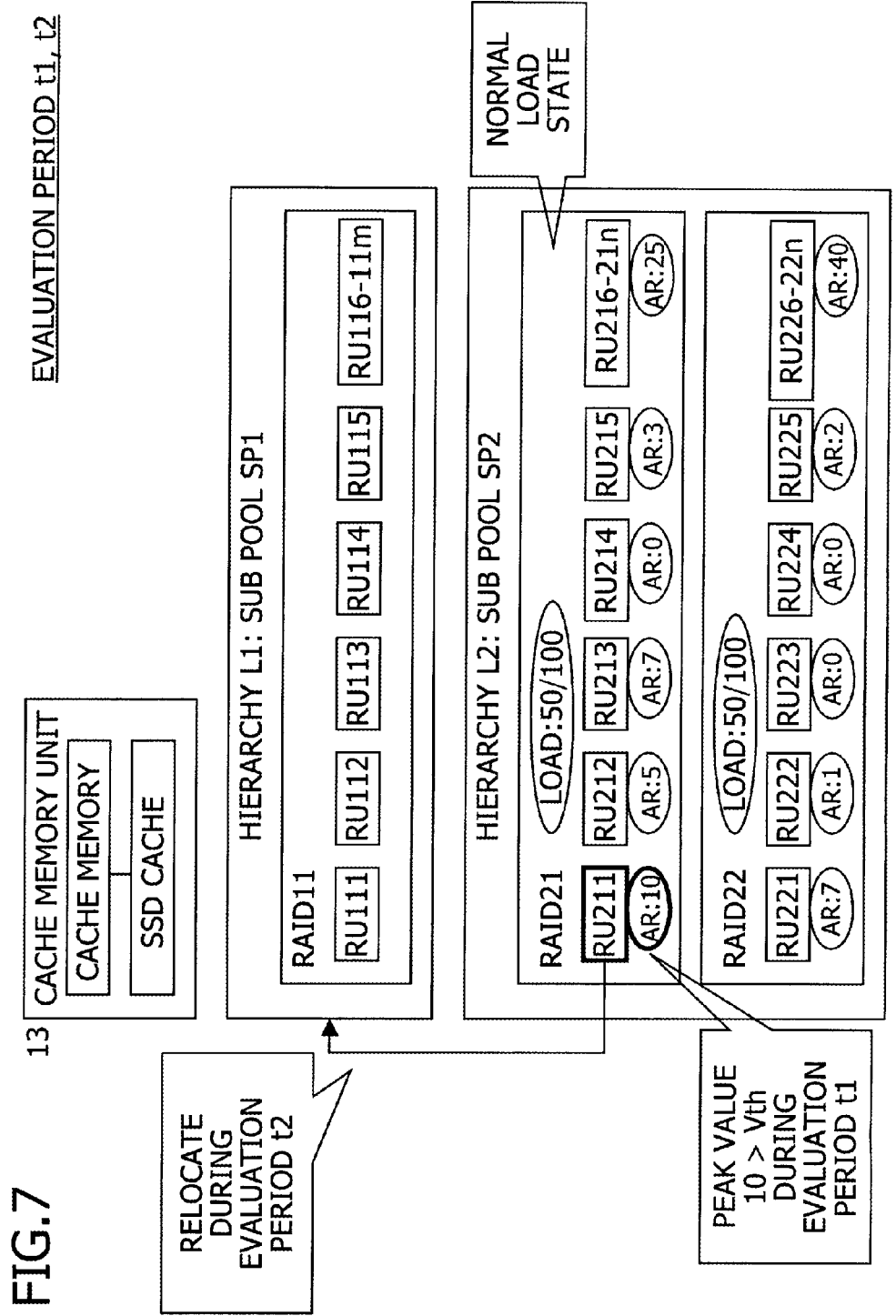
FIG. 7 is a diagram explaining normal storage hierarchy control.
Figure 8:
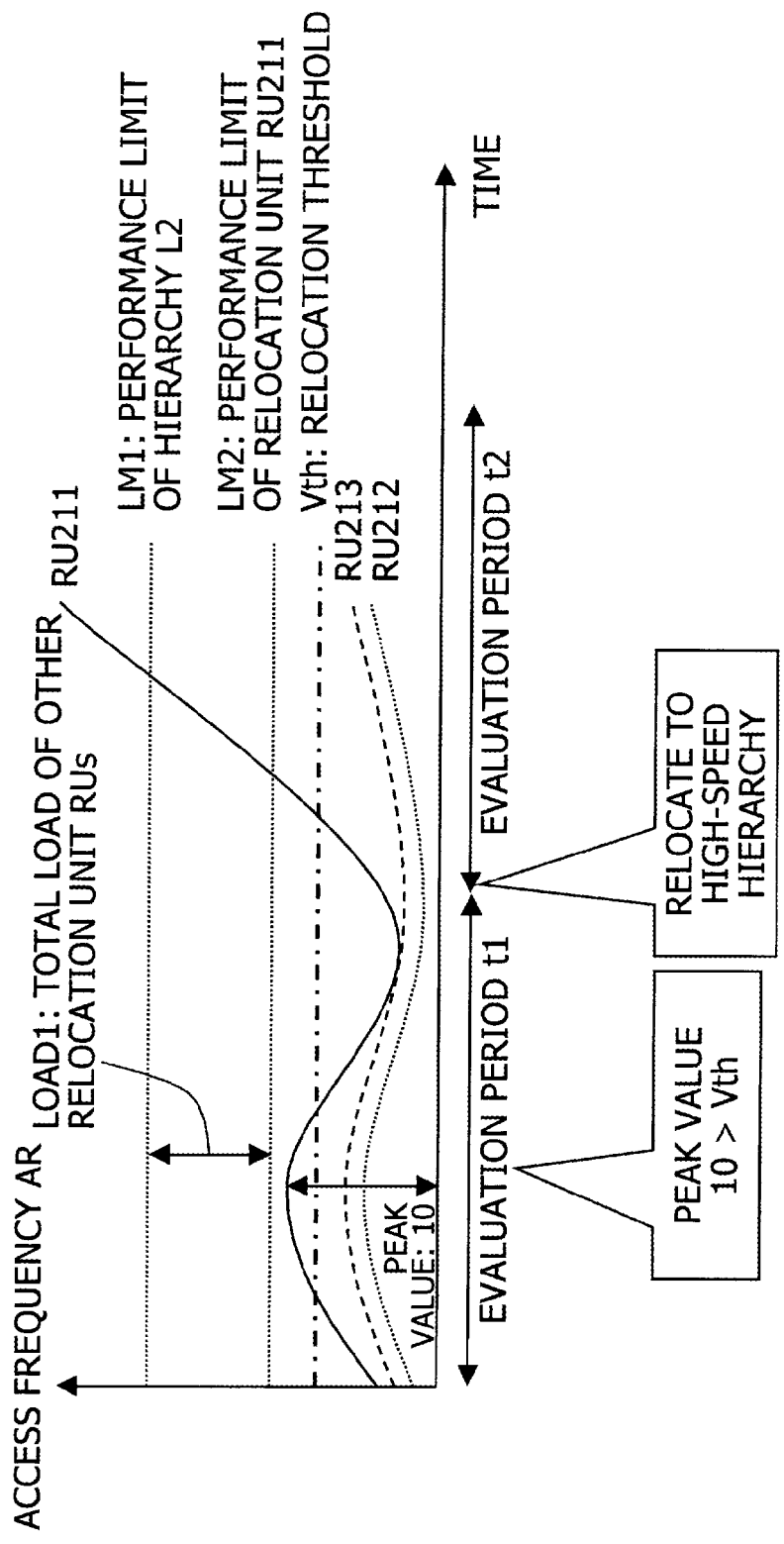
FIG. 8 is a diagram explaining normal storage hierarchy control.

FIG. 7 and FIG. 8 are diagrams explaining normal storage hierarchy control. FIG. 7 illustrates the load condition LOAD of the RAID group in the storage device group in the storage apparatus, and the access frequency AR of the relocation unit. Moreover, FIG. 8 illustrates the access frequency AR and the load LOAD state (performance limit LM) relative to the time axis. Here, let it be assumed that the relocation unit RU211 in the RAID group RAID 21 in the low-order hierarchy L2 is the focus of attention.

FIG. 8 illustrates the performance limit LM1 of the low-order hierarchy L2, and the performance limit LM2 of the relocation unit RU211, and the LM1-LM2 become the total load LOAD1 other than the relocation unit RU211. In addition, during the evaluation period t1, FIG. 8 illustrates that the peak value of the access frequency AR of the relocation unit RU211 is 10. FIG. 7 indicates the access frequency AR of the respective relocation units measuring during the evaluation period t1. According to this, the access frequencies AR of the relocation units RU211 to RU215 in the RAID group RAID 21 are 10, 5, 7, 0, and 3, the total access frequency AR of the other relocation units RU216-21n is 25. Accordingly, the load factor of the RAID group RAID 21 becomes 50/100=50% assuming the number of accesses as the performance limit is 100. The load factor is in a normal load condition, and not an overload state.

In addition, the access frequency AR of the relocation unit RU211 is 10 and, as illustrated in FIG. 8, exceeds the relocation threshold Vth (=8). Accordingly, based on the storage hierarchy control, during the subsequent evaluation period t2, data of the relocation unit RU211 is relocated to the high-order hierarchy L1. Consequently, as illustrated in FIG. 8, the access frequency AR to the data in the relocation unit RU211 during the evaluation period t2 increases significantly.

As described above, according to the normal storage hierarchy control, the respective RAID groups are not in an overload state and, if the access frequency AR measured during the evaluation period t1 is exceeding the threshold Vth, data is relocated to a higher order hierarchy during the subsequent evaluation period t2, which enables higher speed access, and it is thereby possible to deal with the increase in the requested access request.

[Example of Abnormal Storage Hierarchy Control]

Figure 9:
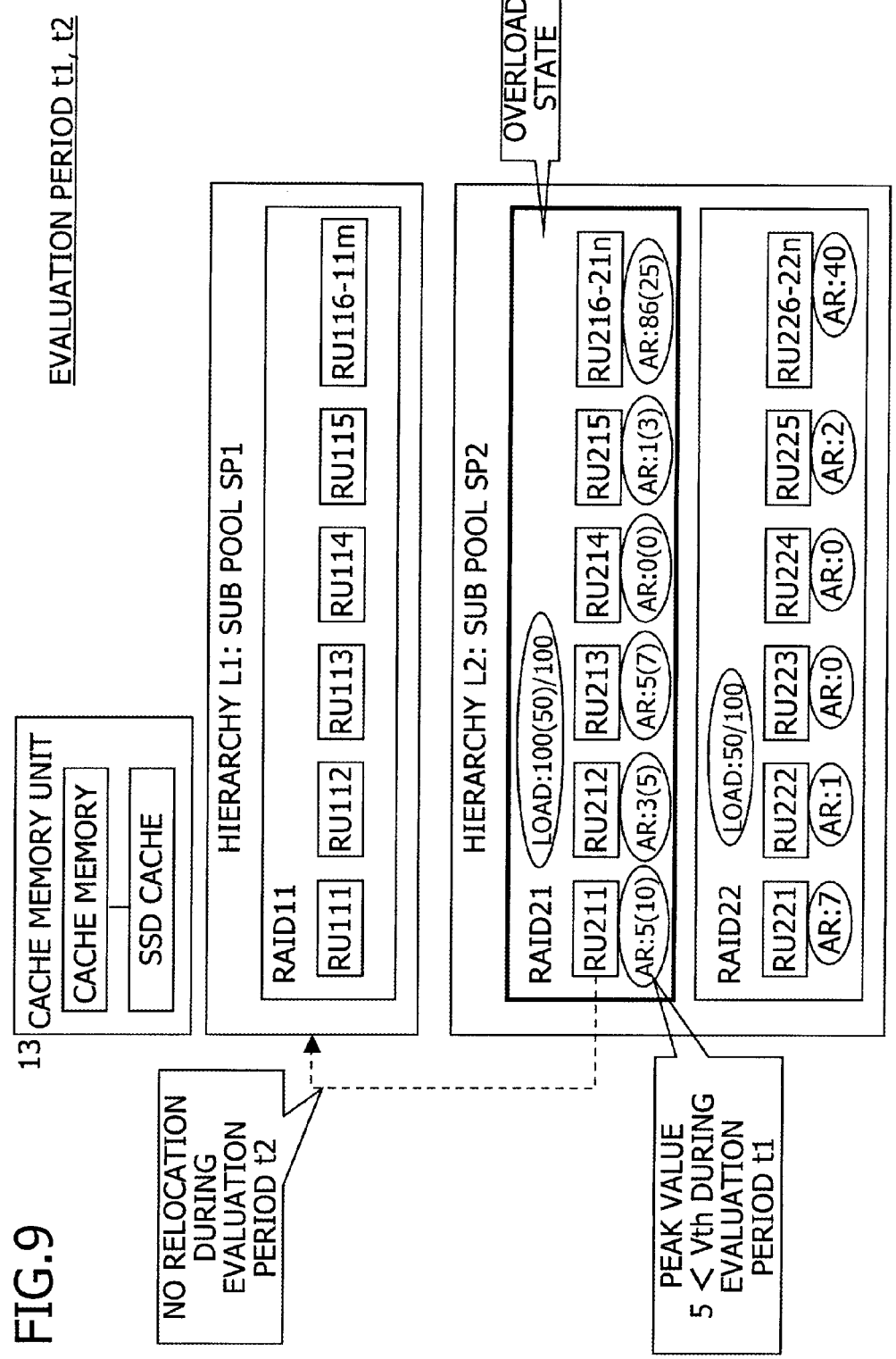
FIG. 9 is a diagram explaining abnormal storage hierarchy control.
Figure 10:
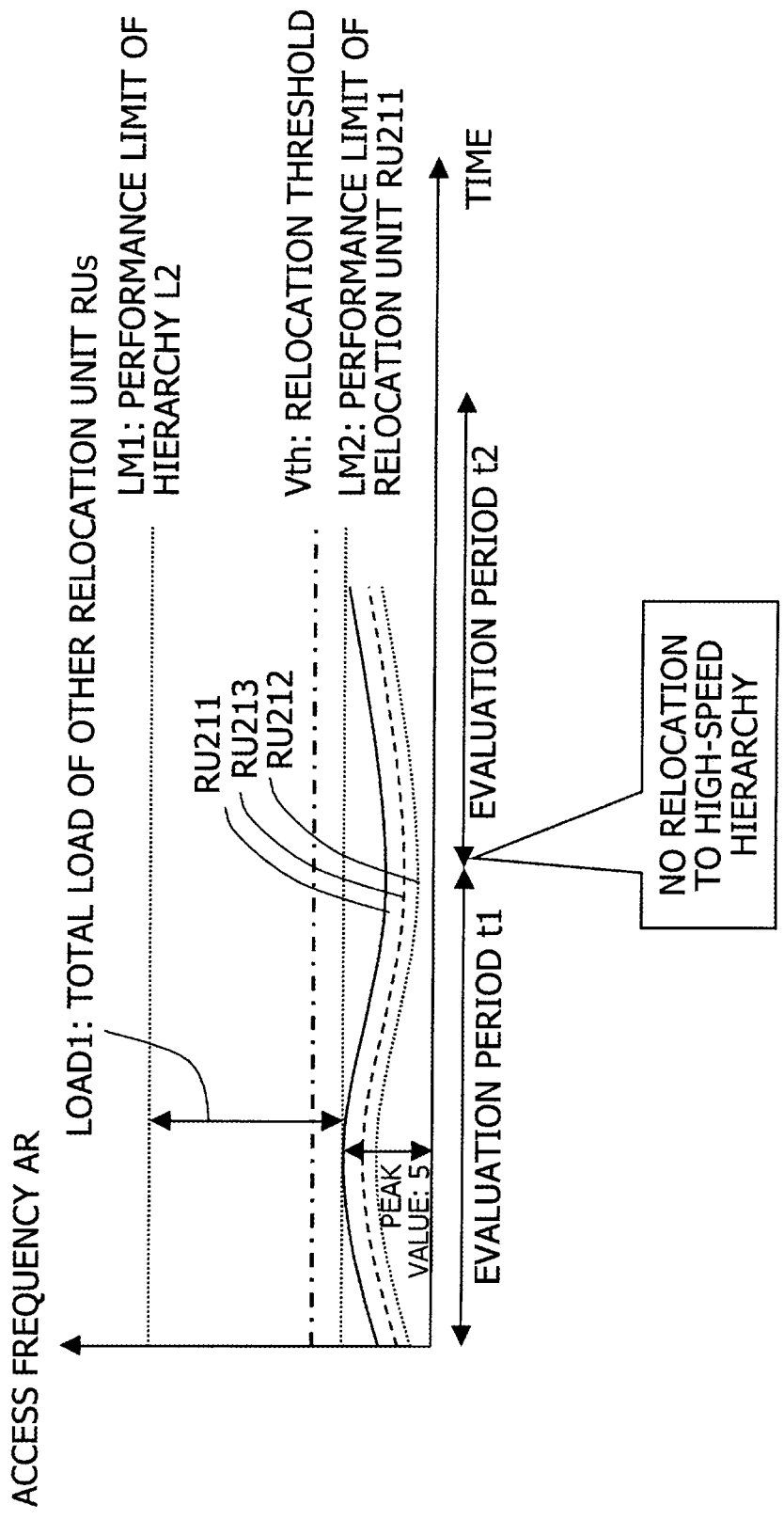
FIG. 10 is a diagram explaining abnormal storage hierarchy control.

FIG. 9 and FIG. 10 are diagrams explaining abnormal storage hierarchy control. FIG. 9 and FIG. 10 are diagrams corresponding to FIG. 7 and FIG. 8 described above.

FIG. 9 illustrates that the RAID group RAID 21 in the low-order hierarchy L2 is in an overload state, and the access frequency AR of the respective relocation units RU has decreased. The respective access frequencies AR illustrate the value of the overload state, and the value (same value as FIG. 7) of the normal load condition in the parentheses. In other words, the access frequency AR of the relocation units RU211 to RU215 in the RAID group RAID 21 decreases as 5, 3, 5, 0 and 1, and the total access frequency AR of other relocation units RU216-21n suddenly increases to 86. Conversely, since the total access frequency AR of the relocation units RU216-21n suddenly increased to 86, it could also be said that the access frequency AR of the relocation units RU211 to RU215 has decreased. Accordingly, the load factor of the RAID group RAID 21 becomes 100/100=100% assuming the number of accesses as the performance limit is 100, and this load factor is an overload state.

In particular, with the relocation unit RU211, the RAID group RAID 21 to which it belongs become an overload state and causes a delay in response even though the originally requested access frequency AR is 10, and the actually executed access frequency AR has stopped at 5. This access frequency is different from the access frequency that was originally requested by a server or the like.

As illustrated in FIG. 10, during the evaluation period t1, since the total load LOAD1 of the relocation units RU other than the relocation unit RU211 has increased, the performance limit LM2 of the relocation unit RU211 will decrease, and the access frequency AR of the relocation unit RU211 is unable to exceed the performance limit LM2. Consequently, the measured access frequency AR becomes 5 at the peak value, and is smaller than the requested access frequency.

This access frequency AR=5 is smaller than the relocation threshold Vth=8. Thus, during the subsequent evaluation period t2, data of the relocation unit RU211 is not relocated to a high-order hierarchy, and continues to remain in the low-order hierarchy L2. With this, appropriate storage hierarchy control cannot be performed.

[Example of Storage Hierarchy Control According to this Embodiment]

Figure 11:
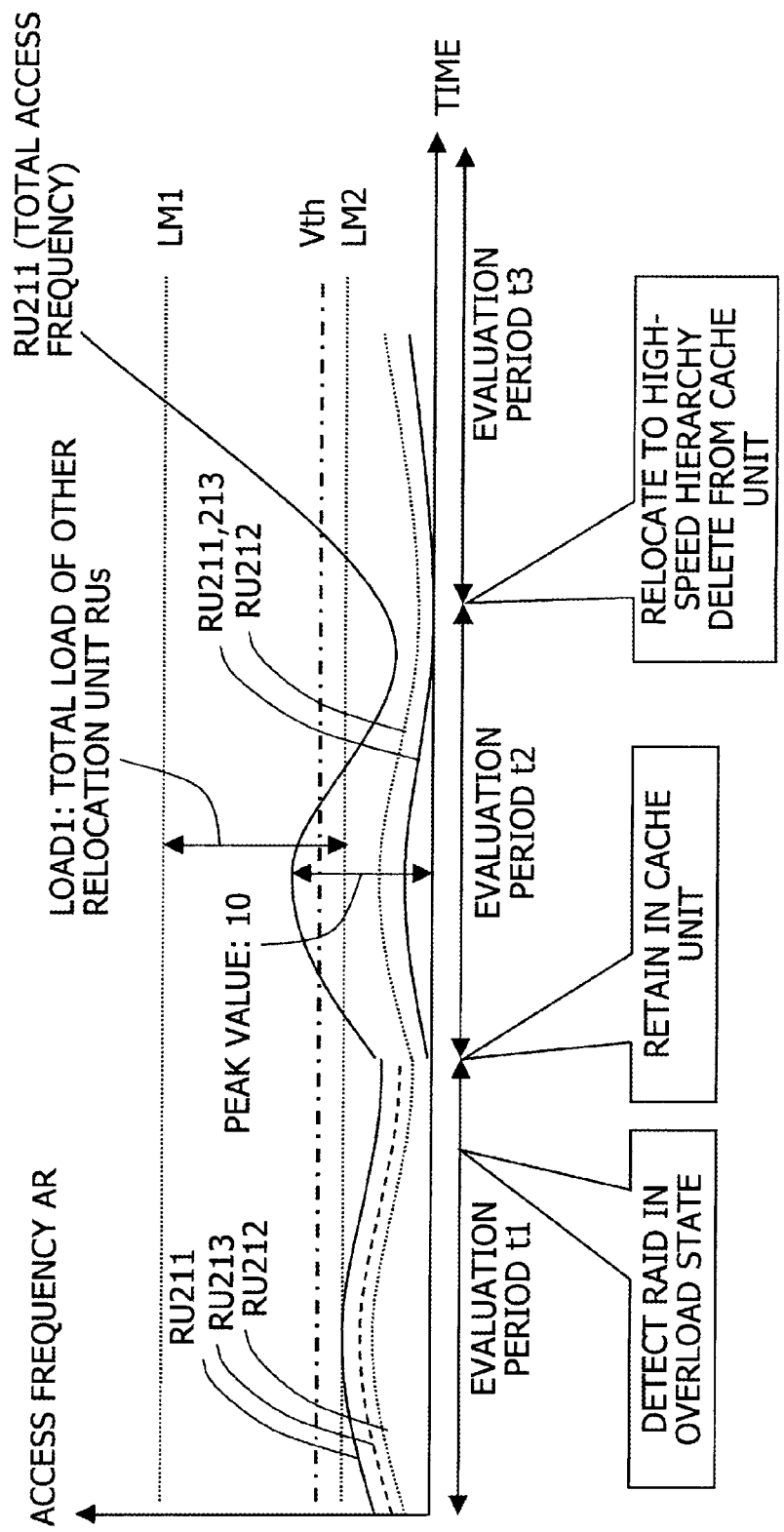
FIG. 11 is a diagram illustrating an example of the access frequency and load condition when the storage hierarchy control according to this embodiment is applied.
Figure 12:
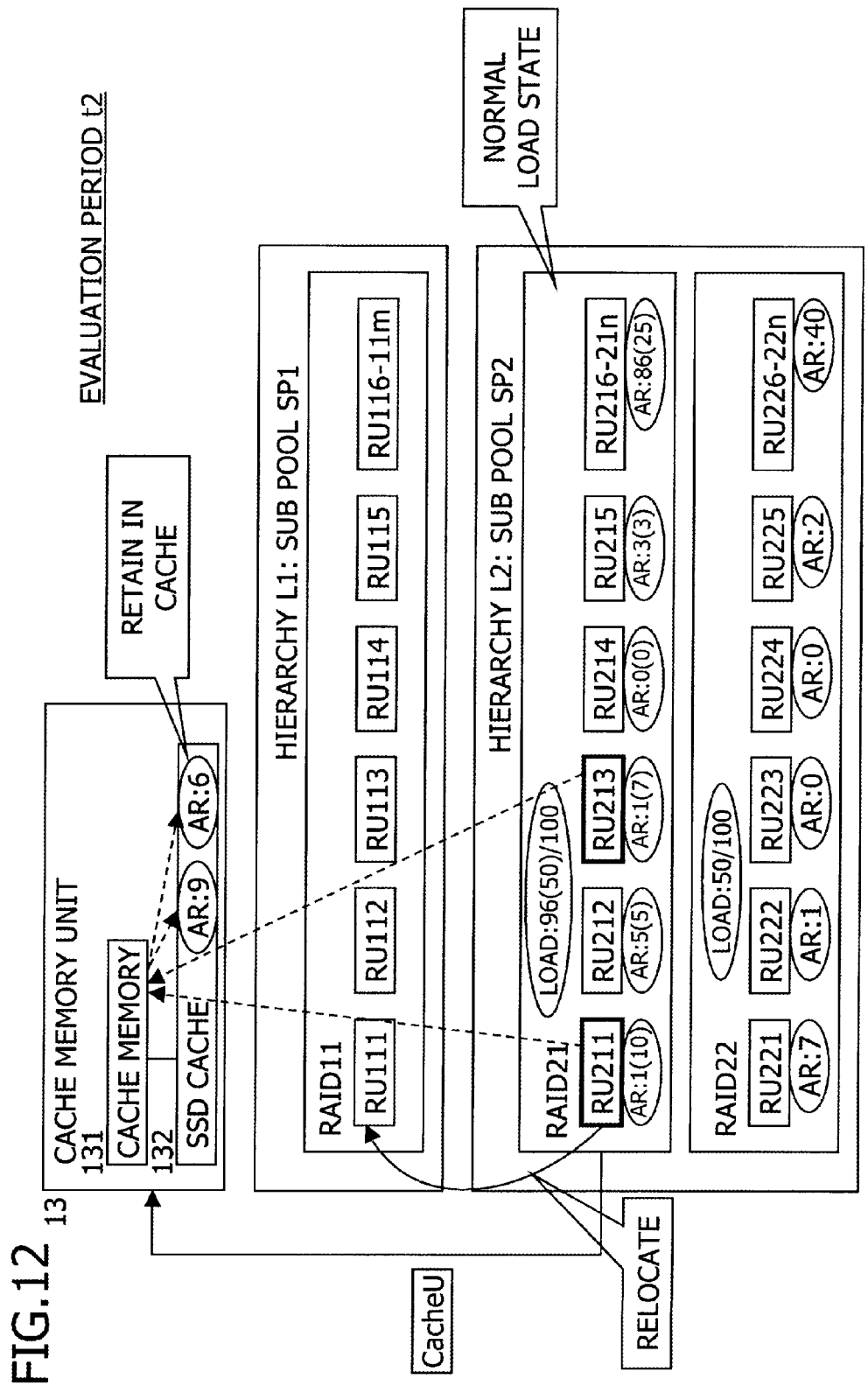
FIG. 12 is a diagram illustrating an example of the load condition LOAD of the RAID group in the storage device group during the evaluation period t2, and the access frequency AR of the relocation unit.
Figure 13:
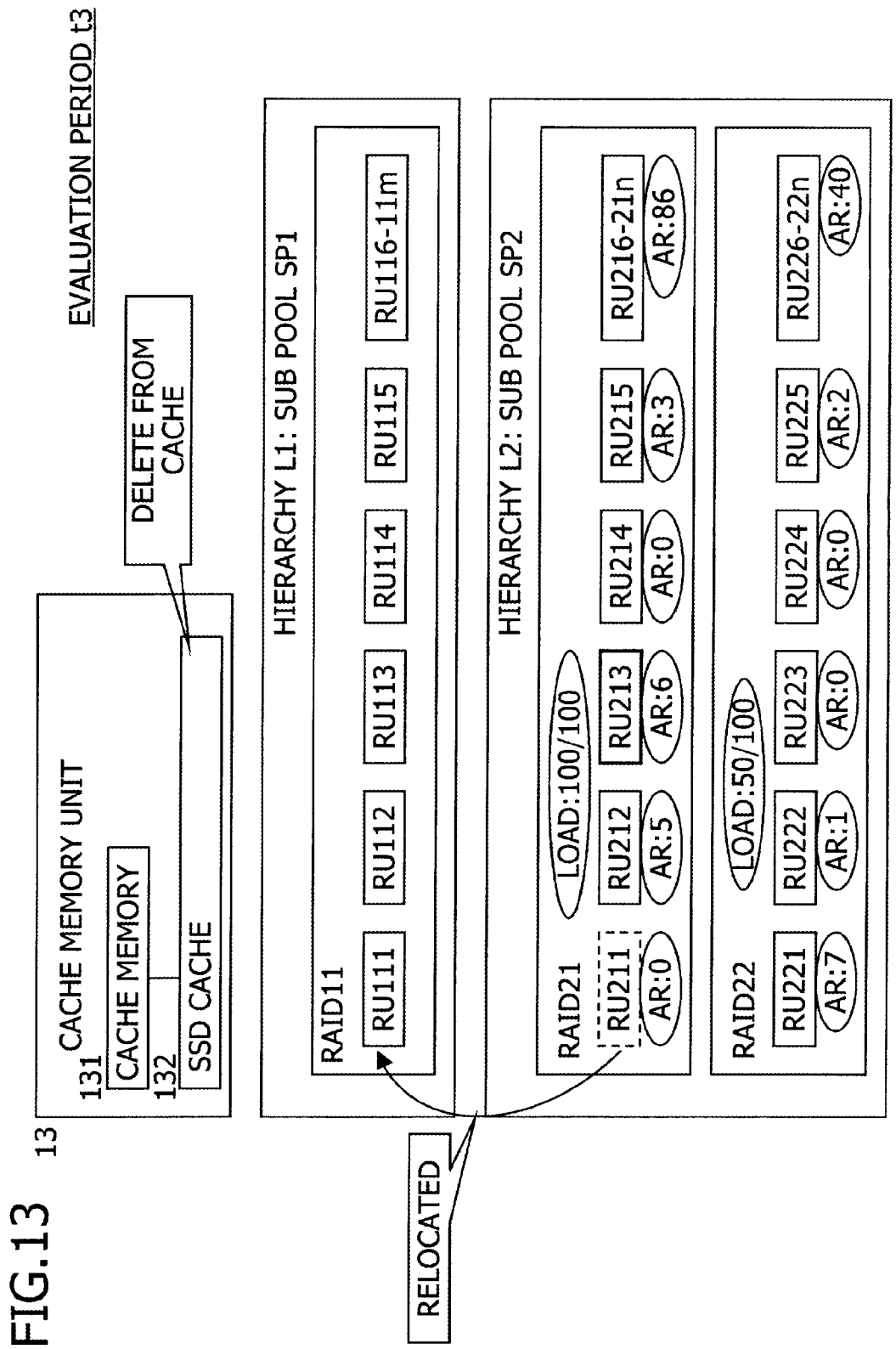
FIG. 13 is a diagram illustrating an example of the load condition LOAD of the RAID group in the storage device group during the evaluation period t3, and the access frequency AR of the relocation unit.

FIG. 11 is a diagram illustrating an example of the access frequency and load condition when the storage hierarchy control according to this embodiment is applied. FIG. 11 is a diagram which corresponds with FIG. 8 and FIG. 10 described above. Moreover, FIG. 12 is a diagram illustrating an example of the load condition LOAD of the RAID group in the storage device group and the access frequency AR of the relocation unit during the evaluation period t2. FIG. 13 is a diagram illustrating an example of the load condition LOAD of the RAID group in the storage device group and the access frequency AR of the relocation unit during the evaluation period t3.

The operation in a case of applying the storage hierarchy control according to this embodiment in the order of the evaluation periods t1, t2, t3 illustrated in FIGS. 12, 13 are now explained in detail.

[Evaluation Period t1]

The evaluation period t1 is the same as the evaluation period t12 explained in the abnormal storage hierarchy control illustrated in FIGS. 9, 10. In other words, the access request to the RAID 21 suddenly increased and the performance limit was exceeded and became an overload state, the access frequency of the respective relocation units RU deteriorated, and is lower than the requested access frequency.

The storage hierarchy control of this embodiment is executed according to the flowchart of FIG. 2. At the latter half of the evaluation period t1, the monitoring unit 21 in the storage hierarchy control apparatus 20 executes monitoring processing S1. In other words, the monitoring unit 21 acquires and monitors the access frequency AR of the respective relocation to units RU and the measurement result of the load factor (utilization rate of the physical disk) LOAD of the respective RAID groups during the evaluation period t1 from the controller 12 in the storage apparatus 10.

The acquired access frequency and load factor in the evaluation period t1 in FIG.11 are the same as those illustrated in FIG. 9. In other words, the relocation unit RU211 in the low-order hierarchy L2 is measured with the access frequency AR kept low at 5 due to an overload state, and the RAID group RAID 21 including the relocation unit RU211 is measured as an overload state.

Subsequently, the evaluation unit 22 in the storage hierarchy control apparatus 20 executes evaluation processing S2, evaluates the access frequency AR of the measured relocation unit, and creates a relocation candidate list. In other words, the candidate list is created by designating as candidates for relocating to a higher order hierarchy, the relocation units RU for which access frequency exceeding a first threshold in the low-order hierarchy L2 was measured, and designating as candidates for relocating to a lower order hierarchy, the relocation units RU for which access frequency which falls below a second threshold in the high-order hierarchy L1. Nevertheless, since the access frequency of all relocation units in the RAID group RAID 21 is suppressed and measured, the relocation unit RU211 is not included in the relocation candidate list and does not become a relocation target.

Subsequently, the relocation device 23 in the storage hierarchy control apparatus 20 executes relocation processing S3. The relocation device 23 executes the relocation of data in the candidate relocation unit according to the relocation candidate list created by the evaluation unit 22. However, the relocation unit RU211 and the like will not be included in the relocation candidate list depending on the measurement result during evaluation period t1. Thus, the relocation device 23 does not perform the relocation processing for the data of RU211 during the evaluation period t1.

Subsequently, the overload control unit 24 in the storage to hierarchy control apparatus 20 executes overload control processing S4. In other words, the overload control unit 24 notifies, to the SSD cache control unit 121, those among the relocation units RU211-21n existing in the RAID group RAID 21 in an overload state, which have a relatively high access frequency AR, as the cache candidates. Moreover, if there is any data that was already forcibly retained in the cache memory unit 13 during the evaluation period t1, the overload control unit 24 notifies the end of the forced retention to the SSD cache control unit 121.

Figure 14:
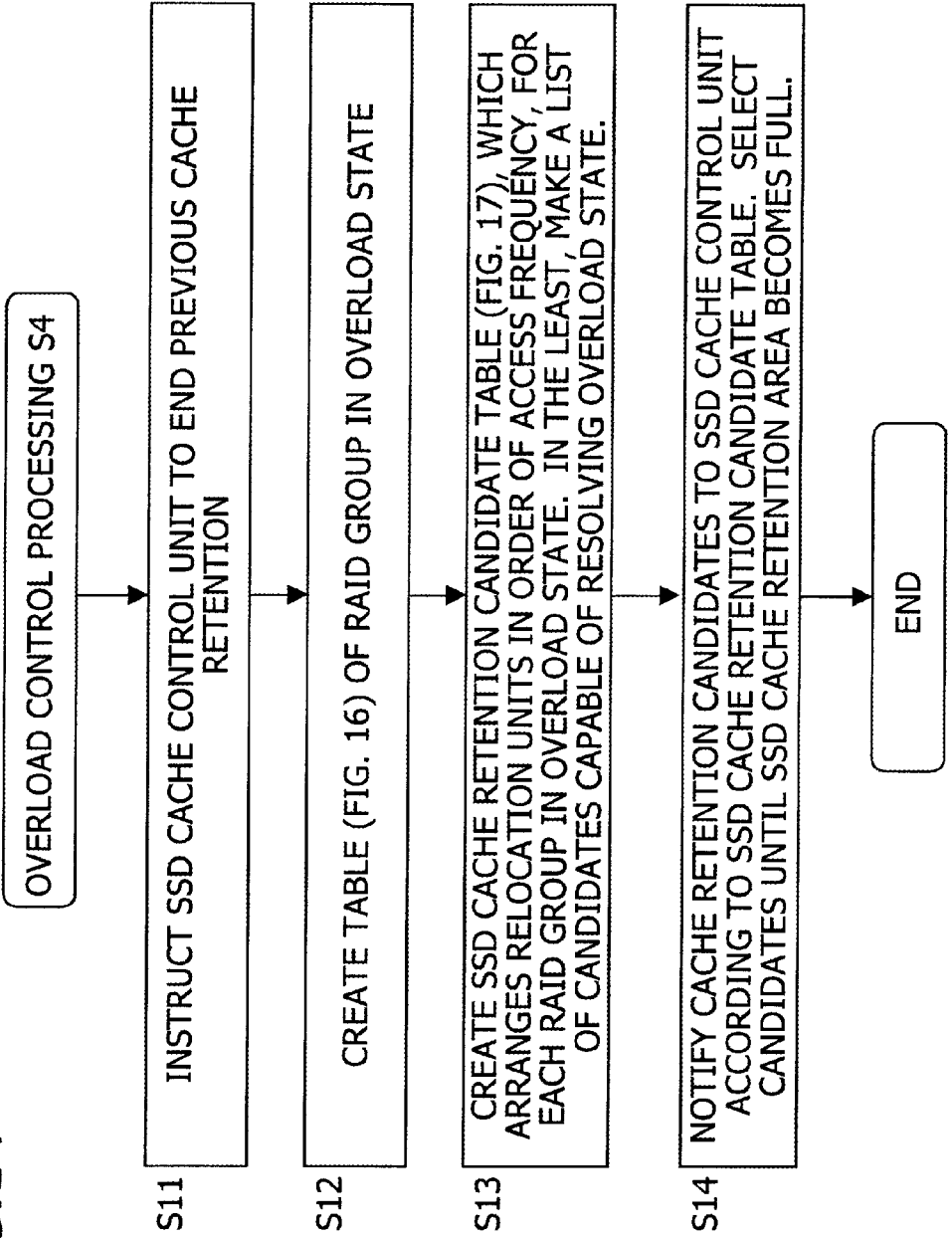
FIG. 14 is a flowchart of the overload control processing S4.

FIG. 14 is a flowchart of the overload control processing S4. The overload control unit 24 instructs the SSD cache control unit 121 to end the forcible retention in the SSD cache 132 (S11). The meaning of this processing will be described later. In addition, the overload control unit 24 creates a table (FIG. 16) of the RAID groups that became an overload state during the evaluation period t1 (S12).

FIG. 16 is a diagram illustrating an example of the table of the RAID group in an overload state. During the evaluation period t1 illustrated in FIG. 9, since evaluation is made that the RAID group RAID 21 is in an overload state, "21" of the RAID group RAID 21 is indicated in the overload state RAID group table of FIG. 16.

Subsequently, the overload control unit 24 creates a cache retention candidate table (FIG. 17) in which relocation units are arranged in the order of access frequency for each RAID group in an overload state (S13). Relocation units capable of at least resolving the overload state of the respective RAID groups are listed in the cache retention candidate table.

FIG. 17 is a diagram illustrating an example of the cache retention candidate table. FIG. 17 lists the numbers 211, 213, 212, 215 of the relocation units RU211, RU213 of the RAID group RAID 21. In other words, while the access frequency of the respective relocation units with the RAID group RAID 21 in an overload state is reduced or suppressed, the relocation units are listed as the cache retention candidates in descending order of access frequency in FIG. 9.

As illustrated in FIG. 9, when the access frequencies AR, 5, 5 of the relocation units RU211, RU213 with high access frequency AR in the RAID group RAID 21 in the period t1 are subtracted from the performance limit 100, the result is 90, and the threshold of the overload state will fall below, for example, 92. Accordingly, when the relocation units RU211, 213 are at least listed in the cache retention candidate table as the cache retention candidates, they are retained in the cache in the SSD cache control described later.

Subsequently, the overload control unit 24 instructs the relocation unit of the cache retention candidate to the SSD cache control unit 121 according to the cache retention candidate table (S14). In the foregoing case, the overload control unit 24 instructs the relocation unit in the cache retention candidate table as the cache retention candidate until the SSD cache retention area in the SSD cache 121 becomes full.

Here, the capacity to be secured as the SSD cache retention area in the SSD cache 132 is now explained. The capacity of the SSD cache retention area desirably has the capacity for at least one relocation unit. When the capacity of the SSD cache retention area is the same as the capacity of one relocation unit, the relocation unit with the highest access frequency is at least instructed to the SSD cache control unit 121 as the cache retention candidate. Consequently, with the control based on the SSD cache control unit described later, data in one designated relocation unit is retained in the SSD cache 132 for each access. So as long as data is retained as described above, it is possible to make appropriate access to the data of at least one relocation unit, and measure the appropriate access frequency. In addition, if the data of the relocation unit to be retained in the cache is relocated to the high-order hierarchy L1 for each evaluation period, while it may take time, the requested data of high access frequency can be relocated to a higher order hierarchy.

Figure 15:
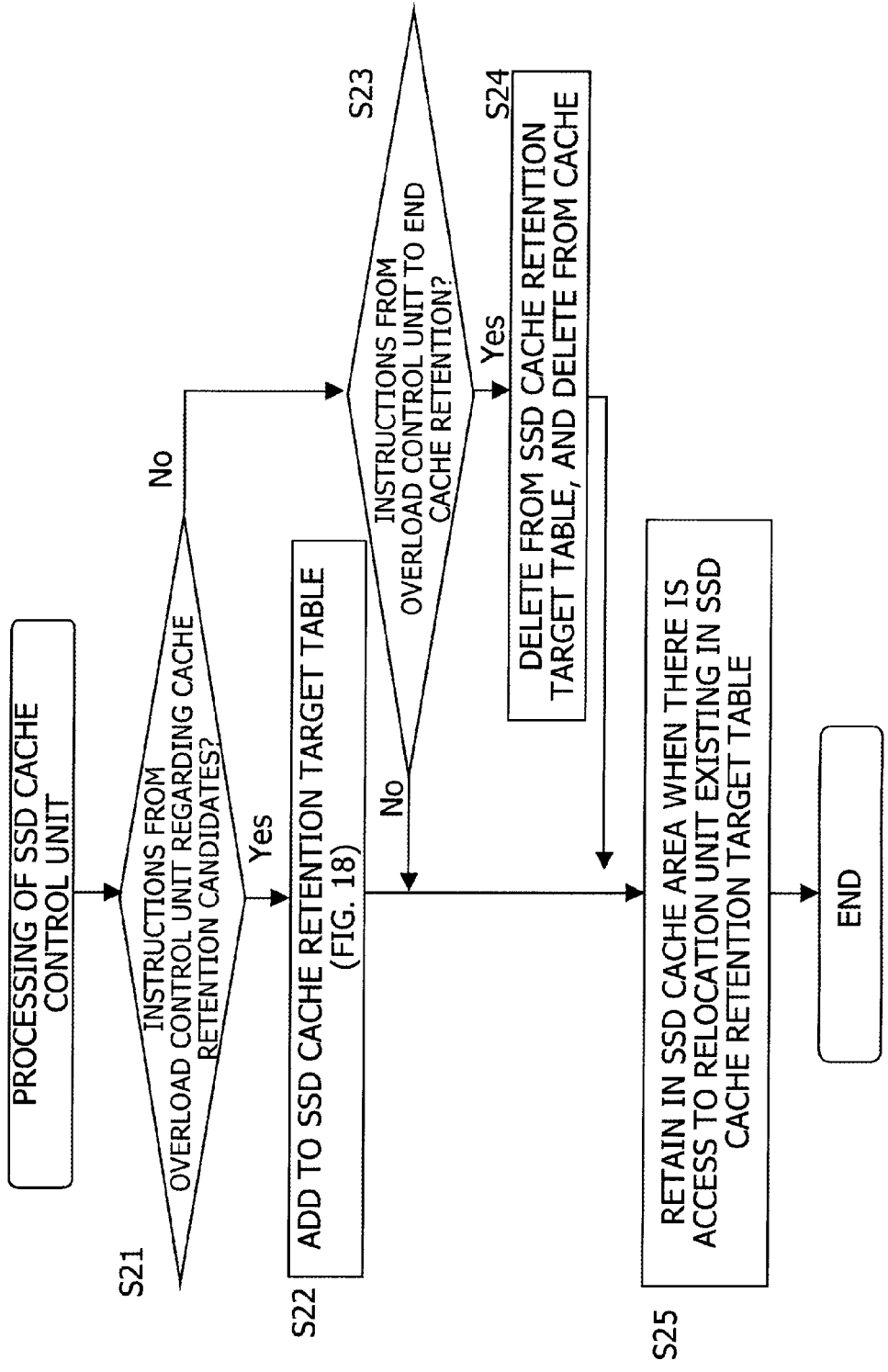
FIG. 15 is a flowchart illustrating the processing of the SSD cache control unit.

FIG. 15 is a flowchart illustrating the processing of the SSD cache control unit. Foremost, the SSD cache control unit 121 receives instructions of the relocation unit of the cache retention candidate from the overload control unit 24 in the storage hierarchy control apparatus 20 (S21). In this example, let it be assumed that at least the relocation units RU211, RU213 are designated as the cache retention candidates.

In response, the SSD cache control unit 121 adds the cache retention candidate to the SSD cache retention target table (FIG. 18) (S22). Moreover, the SSD cache control unit 121 receives a cache retention end command from the overload control unit 24 (S23). Upon receiving the foregoing command, the SSD cache control unit 121 deletes the relocation unit, for which the cache retention is to be ended, from the SSD cache retention target table (S24).

FIG. 18 is a diagram illustrating an example of the SSD cache retention target table. In this example, the relocation units RU211, RU213 in the RAID group RAID 21 are listed in the SSD cache retention target table.

[Evaluation Period t2]

Based on the SSD cache retention target table that was created as described above, the SSD cache control unit 121 forcibly retains, in the SSD cache retention area, data in the relocation units RU211, RU213 designated by the SSD cache retention target table among the data that was written as a result of overflowing from the cache memory 131 in the cache memory unit 13. Then, during the subsequent evaluation period t2, the SSD cache control unit 122 controls the overflow from the SSD cache 132 as a result of other data being written therein not to occur (S25).

Specifically, when there is access to the relocation units RU211, RU213 listed in the SSD cache retention target table, the SSD cache control unit 121 writes data into the cache memory 131 and, during the evaluation period t2, performs control so that, at least, that data will not overflow from the SSD cache 132 and be deleted. In other words, based on normal cache control, the accessed data is stored in the cache memory 131, and stored in the SSD cache 132 upon overflowing from the cache memory 131. Nevertheless, the accessed data does not overflow from the SSD cache 132 and does not become deleted based on the foregoing control. When no to access is made to the relocation units RU211, RU213, they will not become the target of cache control to begin with.

FIG. 12 illustrates the state during the evaluation period t2. In other words, when there is access to the relocation units RU211, RU213, the SSD cache control unit 121 forcibly retains, in the SSD cache 132, data of a predetermined area including the foregoing access area based on the SSD cache retention target table (FIG. 18) created during the evaluation period t1. Data of this predetermined area is the data of the area of the cache control block.

With the foregoing cache control, specifically, as illustrated in FIG. 12, when the relocation units RU211, RU213 are accessed, data thereof is once stored in the cache memory 131, and thereafter stored and retained in the SSD cache 132 based on normal cache control. Note that the data of the cache control is not necessarily data of the relocation unit, but is data of an area of a cache control block containing less access data than the relocation unit.

In addition, during the evaluation period t2 also, as with the evaluation period t1, the storage hierarchy control apparatus 20 executes the monitoring processing 51, the evaluation processing S2, the relocation processing S3 and the overload control processing S4 of FIG. 2. During the evaluation period t2, all access requests to the relocation units RU211, 213 are result in a cache hit in the cache memory unit and subject to response processing excluding the initial request. Accordingly, the access frequency AR thereof becomes the frequency corresponding to the requested access frequency. According to FIG. 12, during the evaluation period t2, the access frequency to the relocation units RU211, RU213 in the RAID group RAID 21 stops at 1 time by the initial access, and the subsequent access requests are processed with the SSD cache 132, and the access frequency AR thereof is 9 and 6, respectively.

Accordingly, the access frequency to the relocation units RU211, 213 during the evaluation period t2 is appropriately measured as 1+9=10 and 1+6=7, respectively. In other words, as illustrated in FIG. 11, the access frequency to the relocation unit RU211 retained in the SSD cache during the evaluation period t2 becomes 10, and will exceed the relocation threshold Vth.

The monitoring unit 21 in the storage hierarchy control apparatus 20 acquires, from the controller 12, the access frequency for each relocation unit during the evaluation period t2 and the measurement result of the load condition for each RAID group, and monitors the results. According to this measurement result, it is determined that the RAID group RAID 21 is no longer in an overload state, and it is further determined that the access frequency of the relocation unit RU211 is exceeding the relocation threshold.

Subsequently, the evaluation unit 22 evaluates the foregoing measurement data, and lists the relocation unit RU211 as the relocation candidate. Consequently, the relocation device 23 in the storage hierarchy control apparatus 20 relocates and stores data of the relocation unit RU211 in one of the relocation units in the RAID group RAID 11 of the high-order hierarchy L1. Based on this relocation processing, since data of the relocation unit RU211 is subject to access processing in the high-order hierarchy L1 during the subsequent evaluation period t3, it is possible to satisfy the high access frequency that is requested by the server.

In addition, the overload control unit 24 executes the processing illustrated in FIG. 14. Consequently, the retention state of the relocation units RU211, RU213 retained in the SSD cache during the evaluation period t2 is cancelled (S11), the RAID group RAID 21 is deleted from the table (FIG. 16) of the RAID groups in an overload state (S12), and is not listed in the SSD cache retention candidate table (S13). Accordingly, instructions regarding the SSD cache retention candidate are not given to the SSD cache control unit (S14).

[Evaluation Period t3]

As illustrated in FIG. 13, during the evaluation period t3, the SSD cache control unit 121 responds to the end command from the overload control unit to 24, ends the SSD cache retention control of the relocation unit RU211, and, when the access frequency decreases based on normal cache control, the relocation unit RU211 overflows from the SSD cache 132 and is deleted. Moreover, the SSD cache control unit 121 has no SSD cache retention to target during the evaluation period t3 since no new SSD cache retention candidate is designated from the overload control unit 24.

In addition, since the data of the relocation unit RU211 in the low-order hierarchy L2 has been relocated to the high-order hierarchy L1 and subject to access processing at the high access speed of the high-order hierarchy L1 in the period t1, it is possible to satisfy the access frequency requested from the server in the period t3. Thus, as illustrated in FIG. 11, the access frequency of data stored in the relocation unit RU211 suddenly increased during the evaluation period t3.

As described above, according to this embodiment, the access frequency requested from the server is appropriately measured by retaining, in the SSD cache 132, the data of the relocation unit in the physical disk in an overload state during the evaluation period, regardless of normal SSD cache control. It is thereby possible to avoid the data of the relocation unit of a high access frequency requested in a physical disk in an overload state from continuing to remain in the low-order hierarchy L2, appropriately measure the access frequency, and appropriately perform storage hierarchy control.

Accordingly, when applying the storage automated hierarchy control to business in which a slow season and a busy season are repeated, or seasonal business in which is suddenly resumed after being stopped for a long period, it is possible to avoid complicated operations such as test runs and manual relocations.

In the foregoing embodiment, the cache memory unit 13 may also be configured from only the DRAM cache memory 131. In the foregoing case, by forcibly retaining, in the cache memory 131, the access data of the relocation area RU211 which was designated as the candidate, according to the cache control of the controller 12 in substitute for the SSD cache control unit 121, it is possible to appropriately measure the access frequency in the same manner, and perform appropriate storage hierarchy control.

In the foregoing embodiment, the physical disk does not have be configured in RAID, and may also be configured from one HDD. In any case, whether the state is an overload state is determined based on the utilization rate of the physical disk.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable storage medium that stores therein a storage control program causing a computer to execute a control process of a storage and a cache memory, the control process comprising:
monitoring access frequency to data in a first storage device with first access speed and a the second storage device with second access speed that is slower than the first access speed, the first storage device and the second storage device being included in the storage;
relocating data in the second storage device, the access frequency of which exceeds a first reference value, to the first storage device; and
conducting an overload processing of copying and retaining, in the cache memory, a part of the data in the second storage device when the second storage device is in an overload state where a load of the second storage device exceeds a second reference value, the load corresponding to a percentage of operating time of the second storage device within a predetermined period of time,
wherein, when the second storage device is in the overload state, the access frequency monitoring is executed in a state where the part of the data in the second storage device in the overload state is retained in the cache memory, and the relocating is executed based on the access frequency to the part of the data in the second storage device.

2. The non-transitory computer readable storage medium according to claim 1, the control process further comprising:
conducting a cache control processing which includes,
checking, upon an access request to the storage, whether data in the address of the access request is stored in the cache memory,
reading the data in the address of the access request from the cache memory when cache hit,
reading the data in the address of the access request from the storage when cache miss,
storing the read data, which is read from the storage when cache miss, in the cache memory, and deleting, from the cache memory, a data being stored in exchange of the storing the read data when the cache memory is full, wherein the monitoring and the relocating are executed in an evaluation period and the evaluation period is repeated, and wherein in the conducting the overload processing, retaining, in the cache memory, the part of the data in the second storage device during the evaluation period, without deleting the part of the data from the cache memory regardless of the cache control processing.

3. The non-transitory computer readable storage medium according to claim 1, wherein each of the first storage device and the second storage device includes relocation units, wherein the relocating includes relocating data of at least one of the relocation units within the second storage device according to access frequency of the data of the relocation units, and wherein, in conducting the overload processing, when an access request is made, retaining, in the cache memory, the part of the data in the relocation unit for which the access request has been made.

4. The non-transitory computer readable storage medium according to claim 3, wherein in the monitoring access frequency, measuring the access frequency to the data in the relocation unit based on a total number of accesses to the part of the data retained in the cache memory and accesses to the data in the relocation unit.

5. The non-transitory computer readable storage medium according to claim 3, wherein in the conducting the overload processing, instructing the storage to write and retain, in the cache memory, the part of the data, for which the access request has been made, at least with respect to the relocation unit with the highest access frequency in the second storage device in the overload state.

6. The non-transitory computer readable storage medium according to claim 5, wherein in the conducting the overload processing, retaining, in the cache memory, one or more relocation units, for which access frequency has been measured, for enabling the second storage device in the overload state to be in a normal load condition.

7. The non-transitory computer readable storage medium according to claim 2, wherein a capacity for retaining the part of the data in the cache memory regardless of the cache control processing is a capacity capable of retaining data of at least one relocation unit.

8. The non-transitory computer readable storage medium according to claim 1, wherein the second storage device includes a plurality of RAID groups, wherein in the monitoring access frequency, monitoring, as the load, the percentage of operating time within a predetermined period of time of a physical disk of each of the plurality of RAID groups, and wherein a case where the second storage device is in the overload state includes a case where the percentage of operating time exceeds the second reference value.

9. The non-transitory computer readable storage medium according to claim 1, wherein the first and second storage devices are assigned to a plurality of logical volumes, and wherein in the monitoring access frequency, measuring the access frequency of the relocation unit based on access processing performed to the logical volumes.

10. A storage system, comprising:

a storage including a first storage device with first access speed, a second storage device with second access speed that is slower than the first access speed, and a cache memory; and a storage hierarchy control apparatus configured to perform hierarchy control of the storage, wherein the storage hierarchy control apparatus includes:

a monitoring unit configured to monitor access frequency to data in the first storage device and second storage device;

a relocating unit configured to relocate data in the second storage device, the access frequency of which exceeds a first reference value, to the first storage device; and an overload processing unit configured to copy and retain, in the cache memory, a part of the data in the second storage device when the second storage device is in an overload state where a load of the second storage device exceeds a second reference value, the load corresponding to a percentage of operating time of the second storage device within a predetermined period of time, wherein, when the second storage device is in the overload state, the monitoring unit is configured to execute the monitoring in a state where the part of the data in the second storage device is retained in the cache memory, and the relocating unit is configured to execute the relocation based on the access frequency to the part of the data in the second storage device.

11. The storage system according to claim 10, wherein the cache memory includes a first memory with third access speed, and an SSD memory with fourth access speed that is slower than the third access speed.

12. A storage hierarchy control apparatus configured to perform hierarchy control of a storage including a first storage device with first access speed, a second storage device with second access speed that is slower than the first access speed, and a cache memory, the storage hierarchy control apparatus comprising:

a monitoring unit configured to monitor access frequency to data in the first storage device and second storage device;

a relocating unit configured to relocate data in the second storage device, the access frequency of which exceeds a first reference value, to the first storage device; and an overload processing unit configured to copy and retain, in the cache memory, a part of the data in the second storage device when the second storage device is in an overload state where a load of the second storage device exceeds a second reference value, the load corresponding to a percentage of operating time of the second storage device within a predetermined period of time, wherein, when the second storage device is in the overload state, the monitoring unit is configured to execute the monitoring in a state where the part of the data in the second storage device is retained in the cache memory, and the relocating unit is configured to execute the relocation based on the access frequency to the part of the data in the second storage device.

* * * * *